United States Patent [19]

Miller et al.

[11] 3,739,632

[45] June 19, 1973

[54] DEVICE FOR TESTING POWER TRANSMISSION COMPONENTS

[75] Inventors: Henry F. Miller, Clifton; Robert L. Bredimus, Wayne, both of N.J.

[73] Assignee: Uniroyal, Inc., New York, N.Y.

[22] Filed: Aug. 30, 1971

[21] Appl. No.: 175,984

[52] U.S. Cl. ............................... 73/136 A, 73/162
[51] Int. Cl. ........................................... G01m 13/02
[58] Field of Search............. 73/136 D, 162, 136 R, 73/133 R, 118, 136 A

[56] References Cited
UNITED STATES PATENTS

| | | | |
|---|---|---|---|
| 2,869,361 | 1/1959 | Powell et al. ...................... 73/162 X |
| 3,100,991 | 8/1963 | Shipley ......................... 73/136 D X |
| 3,152,468 | 10/1964 | Powell............................ 73/136 R X |
| 3,251,223 | 5/1966 | Barg................................... 73/136 A |
| 3,112,643 | 12/1963 | Lanahan ....................... 73/162 UX |
| 3,195,350 | 7/1965 | Reed........................................ 73/162 |
| 2,981,103 | 4/1961 | Livezey................................ 73/162 |
| 3,078,711 | 2/1963 | Shutt..................................... 73/162 |

*Primary Examiner*—Jerry W. Myracle
*Attorney*—John J. McGlew

[57] ABSTRACT

An apparatus for testing a plurality of transmission components such as positive transmission belts, V-type transmission belts, gears and the like under static, dynamic and slow rotational conditions. The apparatus comprises two driven shafts arranged end-to-end and driven by a hydraulic actuator to rotate the shafts in respective opposite directions up to a predetermined number of degrees. A drive shaft is arranged parallel to the two shafts and the test transmission components are affixed at the outer ends of the respective shafts and the associated ends of the parallel drive shaft. The drive shaft and the associated drive motor therefor are mounted on a base movable on a fixed frame which carries the two driven shafts. The base is connected to a drive motor in the form of a fluid pressure actuator piston and cylinder combination for shifting the base along the frame in order to preload the transmission components which are to be tested. The hydraulic rotary actuator applies a constant or programmed torque loading to the individual transmission components being tested to thereby duplicate actual power transmission conditions. After the torque is applied, the two driven shafts are rotated together. The arrangement permits the complete separation of the torque loading from the rotational speed, thereby eliminating the necessity for using high capacity prime mover-dynamometer combinations.

29 Claims, 10 Drawing Figures

United States Patent [19]
Miller et al.
[11] 3,739,632
[45] June 19, 1973
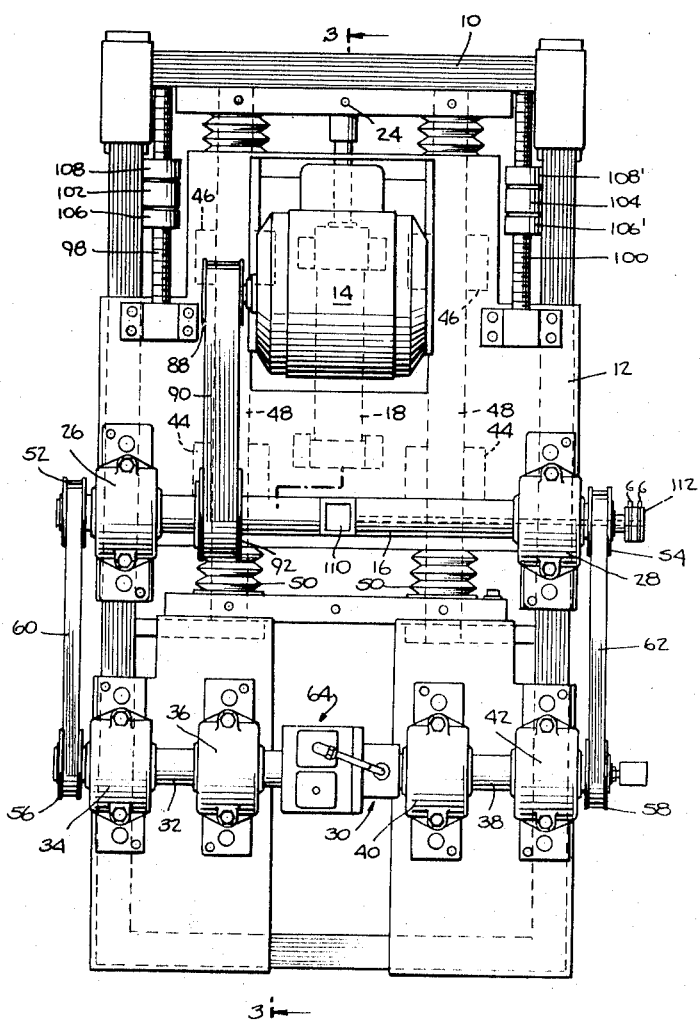

INVENTORS
H. F. MILLER
R. L. BREDIMUS
BY
Robert J. Patterson
ATTORNEY

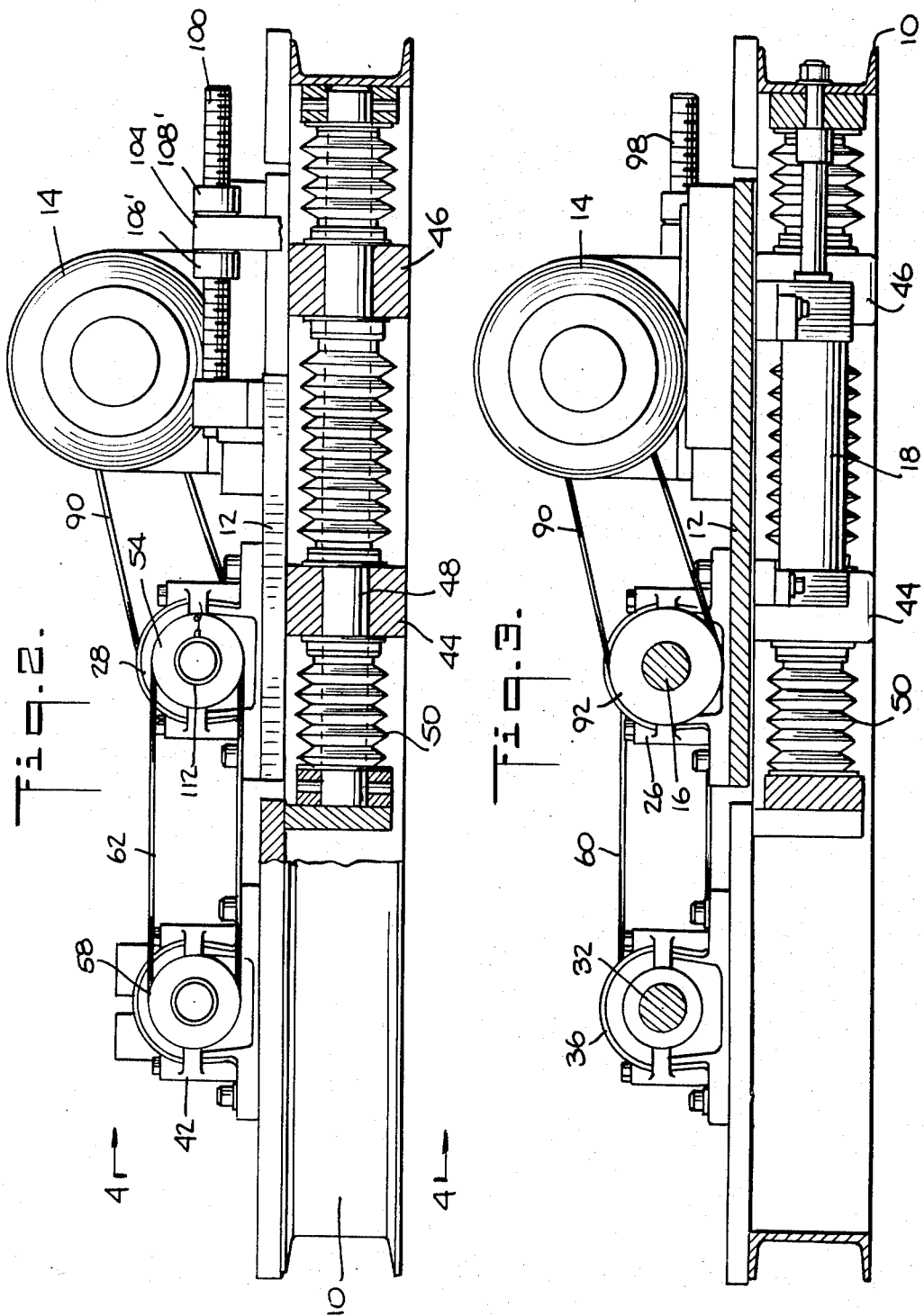

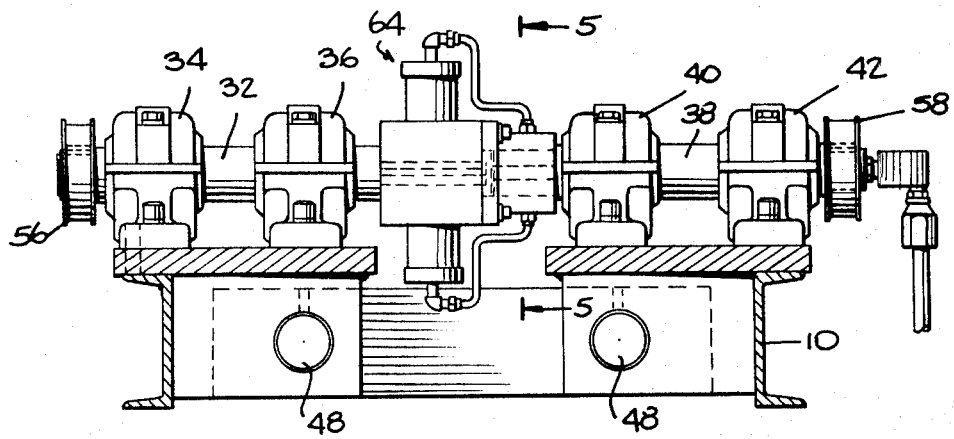
Fig. 4.
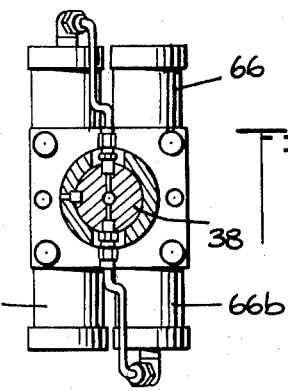
Fig. 5.
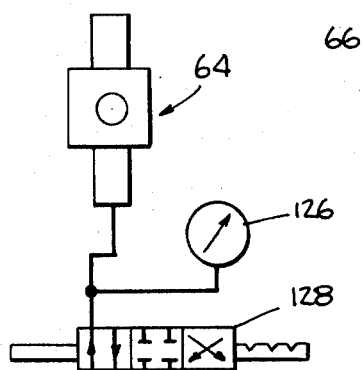
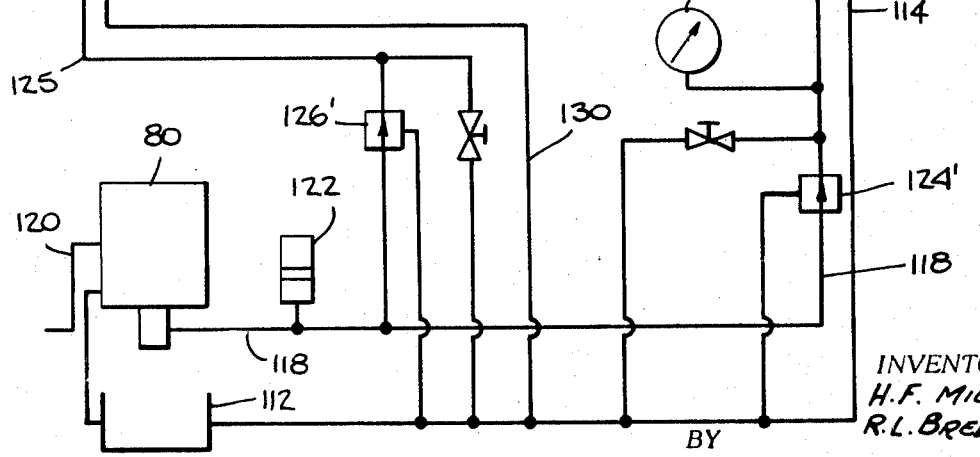
Fig. 6.
INVENTORS
H. F. MILLER
R. L. BREDIMUS
BY
Robert J. Patterson
ATTORNEY

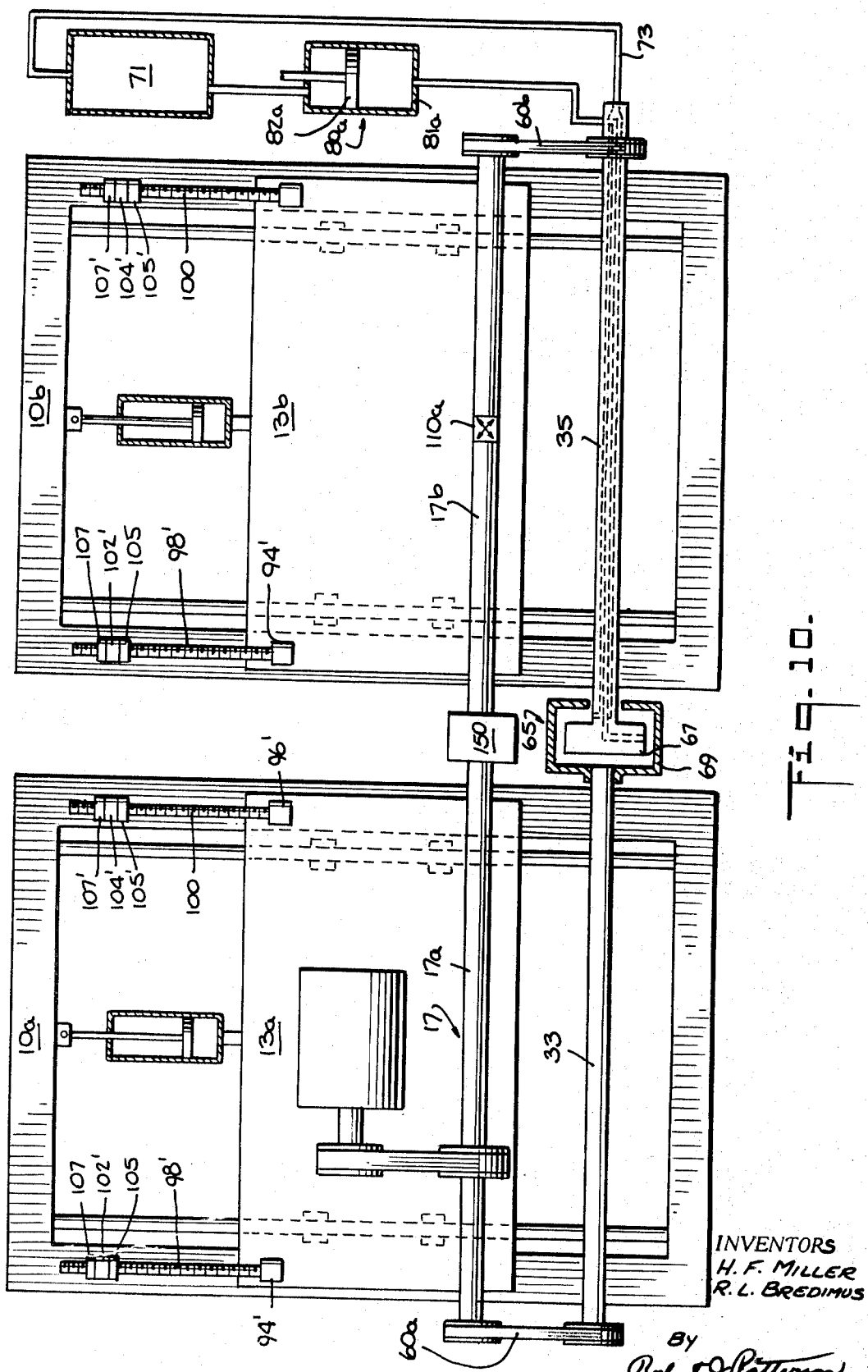

DEVICE FOR TESTING POWER TRANSMISSION COMPONENTS

BACKGROUND OF THE INVENTION

1. Field of the Invention

This invention relates in general to the construction of an apparatus for testing a plurality of power transmission components under static, dynamic and slow rotational conditions. More specifically this invention relates to an apparatus for testing transmission components including positive transmission belts along with their associated pulleys and also gears.

2. Description of the Prior Art

Conventional testing of belts, either positive or V-types, is done by using a prime mover-dynamometer combination. The prime mover is used to generate the required horsepower which is transmitted through the test belt to the dynamometer or brake where it is absorbed. In order to test high capacity belts, very high capacity prime movers and associated high capacity brakes are required. This requires considerable capital expenditure and is characterized by high operating and maintenance costs.

SUMMARY OF THE INVENTION

In accordance with this invention, at least two positive transmission belts or sets of engaged gears are tested simultaneously in a construction in which each end of the drive shaft is simultaneously loaded by a test belt or an engaged gear set. A test belt may be either a positive drive transmission belt or a V-belt. The apparatus makes it possible to separate the dynamic rotational effects from the torque loading so that it is possible to deal with these aspects separately and independently. By preloading and torque loading of the belts, or the gears, as the case maybe, it is possible to apply belt tension only and, by rotating the entire test system, the rotational effects can be included. With conventional prime mover-dynamometer systems, the rate at which work is performed per unit of time can be expressed in units of horse-power which is defined as 33,000 ft. lbs/min. The formula relating the parameters of speed and torque to horsepower is $$HP = 2\pi n T/33,000$$

where $n$ = the revolutions per minute $T$ = the torque, in ft. lbs., and $HP$ = the horsepower.

From this formula it can be seen that since the invention separates the dynamic rotational effect $n$ from the loading $T$, it is possible to deal with these parameters separately. There is not possible in a conventional prime mover-dynamometer system where the torque and speed are linked together in a fixed relationship so that they cannot be varied independently. The apparatus therefore makes it possible to test belts at any torque loading and at any speed because the values of revolutions per minute $n$ and torque $T$ can be varied independently of each other.

The apparatus of the invention makes it possible to perform life testing studies. The apparatus is also capable of performing dynamic photoelastic studies with a minimum of modification such as by removing the flange of one of the test pulleys so that the belt teeth can be observed as the belt trains or runs around the pulley. Static strain studies can be performed because the test belts can be made to carry not only the preload but also the torque load while they are motionless. This cannot be done with a conventional prime-mover dynamometer assembly as known in the prior art.

A further advantage of the apparatus of the invention is that it can be used to study the mode of engagement and dis-engagement of the belt and pulley or gear teeth under different preload and torque load conditions and under any desired rotational speed including slow manual rotation. This cannot be accomplished with a conventional prime-mover dynamometer assembly.

Accordingly, it is an object of the invention to provide an improved device for testing power transmission belts or gears which includes end-to-end arranged shafts which are rotated in opposite directions to apply a torque loading and which are positioned in parallel with a drive shaft. The test belts or gears are located on the respective ends of the drive and driven shafts in a manner such that one shaft loads the belt or gear on one end in one direction, and the other shaft loads the belt or gear on the other end of the drive shaft in the opposite direction.

A further object of the invention is to provide an apparatus for testing power transmission belts in which the drive shaft for testing the belts is arranged so that a loading on one side is counterbalanced by counterloading on another side, and in which a relatively low horsepower driving motor may be employed to achieve a high capacity testing by the combined testing of two belts with the counterloading of the drive shaft by the belts.

A further object of the invention is to provide a test device which includes a mounting frame with a base plate movable over said frame and carrying a drive shaft with a drive motor and which includes a pulley at each end of the drive shaft over which belts to be tested are arranged and connected to associated pulleys of shaft means carried on a fixed location on the frame, the shaft means being formed of two end-to-end driven shafts which are rotated relatively in respective opposite directions to apply torque to the test belts and wherein the base member is movable by a drive motor in order to preload the belts.

A further object of the invention is to provide a device for testing belts which is simple in design, rugged in construction, and economical to manufacture and operate.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the drawing:

FIG. 2 is a partial end elevational and partial sectional view of the device shown in FIG. 1;

FIG. 3 is a section taken along the line 3—3 of FIG. 1;

FIG. 4 is a section taken along the line 4—4 of FIG. 2;

FIG. 5 is a section taken along the line 5—5 of FIG. 4;

FIG. 6 is a schematic diagram of the fluid pressure control system;

FIG. 10 is a view similar to FIG. 7 of still another embodiment of the invention for testing two V-type transmission belts simultaneously.

GENERAL DESCRIPTION OF THE PREFERRED EMBODIMENTS

Figure 7:
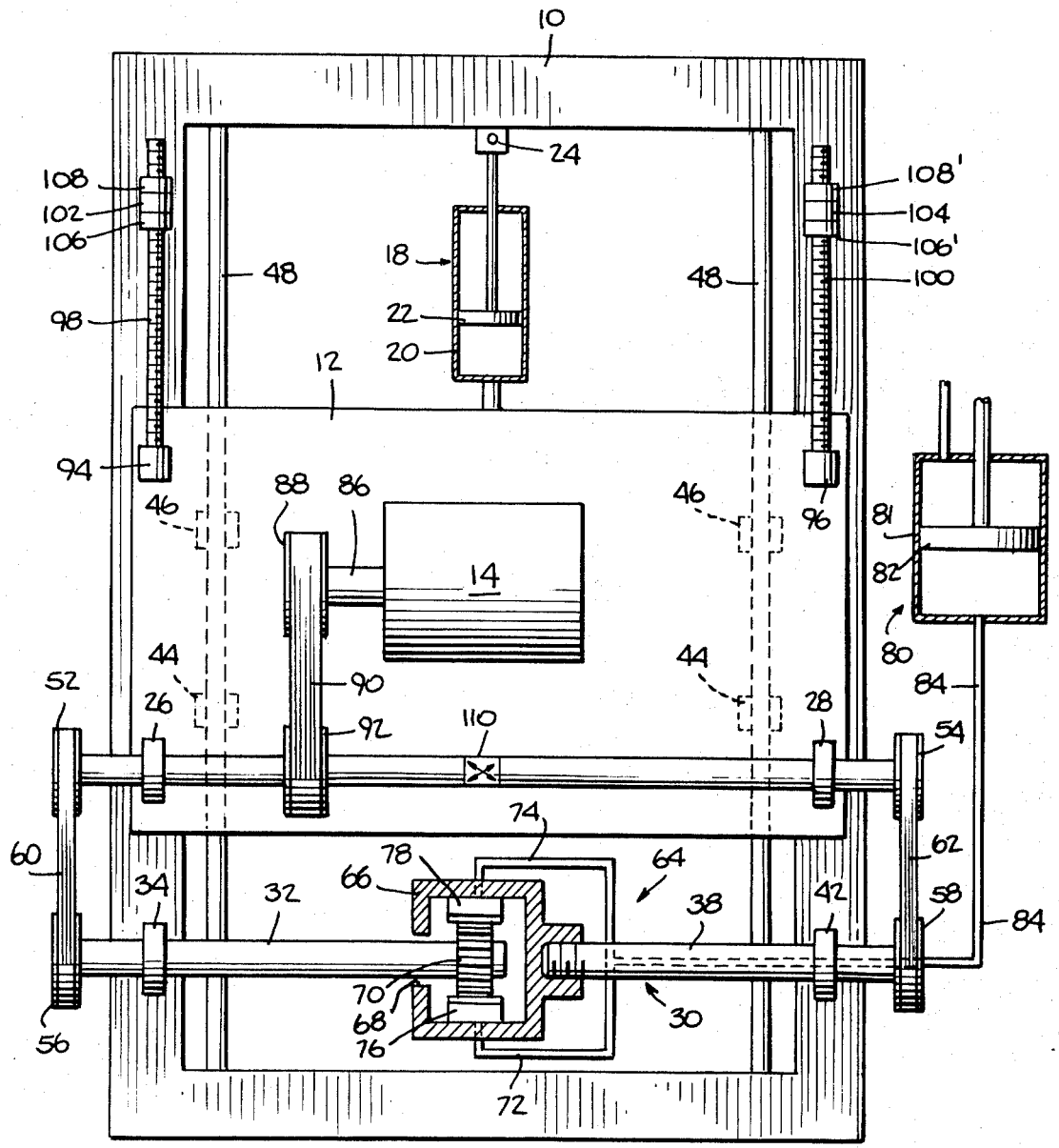
FIG. 7 is a schematic partial top plan and partial horizontal sectional view of the device.

Referring to the drawing in particular, the invention embodied therein in FIGS. 1 to 7 comprises, a frame or housing member, generally designated 10, which provides a support for a movable plate 12 which carries a drive motor 14 for a first shaft or drive shaft 16. The plate 12 is movable backwardly and forwardly along the frame 10 by means of a fluid drive motor, generally designated 18, in the form of a fluid pressure cylinder 20 which is connected to the plate 12, as shown in FIG. 7, and a piston 22 which is slidable in the cylinder 20 and which is affixed at 24 to the frame 10. The plate 12 carries pedestals 26 and 28 which rotatably support the first shaft or drive shaft 16.

In accordance with the invention, the plate 12 is movable toward and away from combined driven shaft means, generally designated 30, which includes a first shaft portion 32 which is rotatably supported by spaced pedestals 34 and 36 carried on the frame 10, and a second shaft portion 38 which is rotatably supported on two pedestals 40 and 42 which are carried on the frame 10. The combined driven shaft means 30, in the form of the two shafts 32 and 38, are mounted on pedestals substantially parallel to the first shaft member or drive shaft 16. When the plate 12 is shifted by the fluid drive motor means 18, shown in FIG. 7, the plate 12 is moved so that the shaft 16 will be moved toward and away from the combined shafts 32 and 38. As shown in FIGS. 2 and 3, the movable plate 12 includes slidable feet 44 and 46 which are movable along guide rod means 48. The guide rod means 48 is protected by a bellows-like cover 50 against dust and dirt.

The drive shaft 16 has an overhung portion outside of each pedestal 26 and 28 which carries pulleys 52 and 54, respectively. The combined shaft means 30 includes a pulley 56 located on the portion of the shaft 32 outside of the bearing pedestal 34 and another pulley 58 located on the portion of shaft 38 outside of bearing pedestal 42.

In order to test positive drive transmission belts under static, dynamic and slow rotational conditions,- the transmission belts 60 and 62 are engaged over the respective pulleys 52, 56 aligned at one end of the drive shaft 16 and pulleys 54 and 58 at the opposite end of the drive shaft 16. Combined shaft positioning means or a torque applier, generally designated 64, is provided between the shafts 32 and 38 in the form of a hydraulic rotary actuator which imparts a relative rotation to the respective shafts 32 and 38 in respective opposite rotation directions in order to apply a torque load to the said shafts which results in the desired tension load in the test belts 60 and 62. The same torque load is applied to shaft 16 through test belts 60 and 62 making it possible to apply the same tension load to the test belts. If during the test one of the test belts fails as by fracture or tooth shear then the torque applier 64 rotates shafts 32 and 38 to the full stop position and the remaining unbroken belt is unloaded except for the initial preload.

The combined shaft positioning means 64 includes a housing 66 affixed to shaft 38 and having an opening 68 through which the shaft 32 extends. The shaft 32 is affixed to a gear 70 which is rotated by the action of a fluid pressure directed through a line 72 and a line 74 to cause movement of rack-like piston elements 76 and 78, respectively, which drive the gear 70 from respective opposite sides to effect its rotation. The rack-like piston elements are slideable in cylinder portions 66a and 66b of the housing 66 (FIG. 5). The reaction forces due to the fluid pressure on rack-like elements 76 and 78 imparts an opposite rotational movement of the shaft 38 in relation to the shaft 32 by rotating housing 66 which is attached to the inner end of shaft 38 relative to the gear 70. Pressure is applied to the lines 72 and 74 from a hydraulic pressure unit 80 which includes a cylinder 81 in which is movable a piston 82 to cause a pressure to be directed through the conduit 84 which extends through the shaft 38 to each of the lines 72 and 74. This permits rotative adjustment and torque variation even during combined rotation of shafts 63 and 38. For this purpose, the shaft 38 is provided with a hydraulic rotary seal. The arrangement permits a small degree of relative rotation of the shafts 32 and 38 in opposite directions when hydraulic pressure is applied by the movement of the piston 82 to apply a torque in selected amounts to the shafts 32, 38, and 16 and corresponding tension loads to be applied to the test belts 60 and 62.

The motor 14 has a drive shaft 86 with a drive pulley 88 driving a belt 90 to rotate a pulley 92 affixed to the drive shaft 16. During operation, the motor 14 drives the drive shaft 16 to rotate the test belts 60 and 62 at the respective ends thereof. The test driven pulley 58, the shaft portion 38, the actuator 64, the shaft portion 32 and the test driven pulley 56 act as a single integral unit and rotate at the same rotational speed in the same direction. The relative rotation of the individual shaft portions 32 and 38 in respective opposite rotational directions to apply a torque load is fixed by the hydraulic rotary actuator 64 and in a typical positive drive installation, this limit need not exceed 90°.

For testing purposes, the base plate 12 is positioned so that the shaft 16 is close to the shaft portion 32 and 38 and the belts to be tested 60 and 62 are trained over the associated pulleys 52 and 56, and 54 and 58. Preload tension is applied to the belts 60 and 62 by actuating the fluid drive motor 18 to shift the plate 12 in a direction to move the shaft 16 away from the shafts 32 and 38. The plate 12 carries supporting blocks 94 and 96 on each side which carry threaded screw members 98 and 100. The screw members 98 and 100 pass through respective stationary smooth bore bearing blocks 102 and 104 and they may be moved axially therein except when they are locked in position by the threading down of lock nuts 106 and 108, and 106' and 108' which are threadable on the respective screws 98 and 100, respectively. After the preload tension is applied to the belts 60 and 62 by the operation of the fluid drive motor 18 by shifting of the plate 12, the respective lock nuts 106 and 108 are threaded along the associated screw member 98 and 100 to a position in which they are locked against each side of the smooth bore block members 102 and 104 and anchor the plate 12 in the desired position.

In a typical testing application for the purpose of determining the life hours to tooth shear failure of transmission belts, the shafts 32 and 38 are located at the mid-point of their rotational limit (45°) by the rotary actuator 64. When the belts 60 and 62 are trained around the respective pulleys at the respective ends of the drive shaft 16, no special effort is taken to equalize the tension in the upper and lower portions of the test belts. The preload which is applied to the test belts by means of the fluid motor 18 moving the plate 12 is measured by a load cell formed in the bracket 24. During the application of the preload, the shafts 32 and 38 are free to rotate with respect to each other to thereby ensure equal tension in the upper and lower portions of the test belts 60 and 62. Once the preload is set and the plate 12 is locked in position by tightening the lock nuts 106 and 108, the fluid motor 18 is deenergized.

The desired torque load is then applied to the test belts by energizing the rotary actuator 64. This causes the shafts 32 and 38 to rotate slightly in opposite directions producing an increase in tension above the preload level in the upper portion of the test belt 62 and the lower portion of the test belt 60 to thereby simulate actual service conditions.

Figure 1:
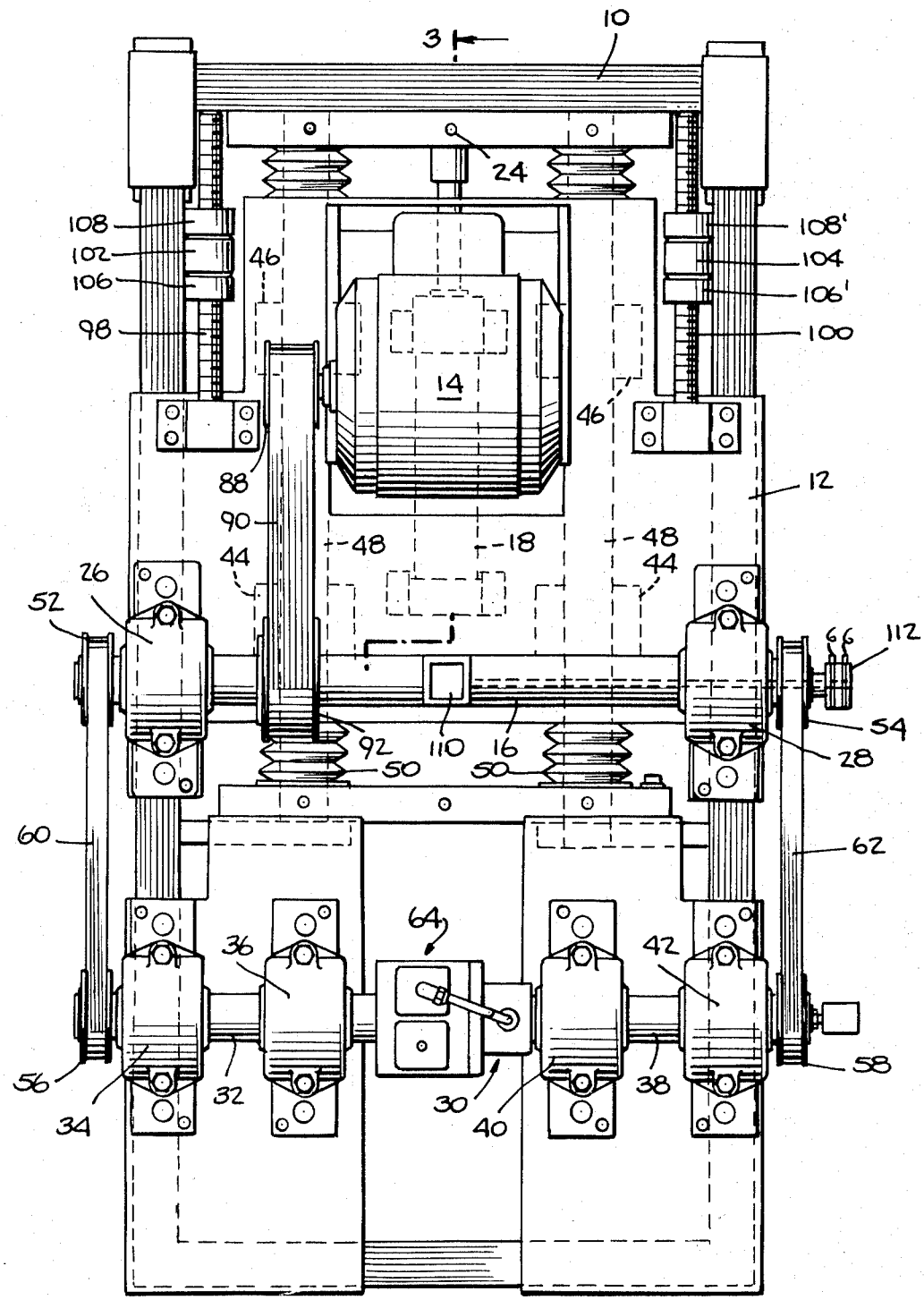
FIG. 1 is a top plan view of a device for testing power transmission belts constructed in accordance with the invention.

The torque loading on the test assembly is measured directly by a strain gauge torsion bridge 110 which is centrally located on the shaft 16. The electrical leads for the torsion bridge as shown in FIG. 1 are conducted through the shaft 16 to a slip ring assembly 112 located at one end of the shaft beyond the pulley 54. This same result could be accomplished by splitting the shaft 16 and attaching a commercial torque meter to the respective shaft parts by means of split couplings.

After the preload and the torque loads are applied to the test belts 60 and 62, the entire test assembly is rotated by the drive motor 14. The apparatus therefore is capable of separately introducing in the test drives the belt loading (preload plus torque load) and the dynamic effects (revolutions per minute, centrifugal loading, tooth engagement and tooth disengagement).

A test apparatus as outlined above has been constructed which can test 8 millimeter pitch and 1 inch wide positive drive transmission belts with a maximum preload of 750 lbs. The apparatus is powered by a 5hp 3,600 rpm AC motor. The motor shaft pulley 88 is an 8 millimeter pitch toothed pulley with a pitch diameter of 3.208 inches. The drive belt 90 is an 8 millimeter pitch toothed transmission belt 2 inches wide with a pitch length of 38.11 inches. The drive pulley 92 on the shaft 16 is an 8 millimeter pitch toothed pulley with a pitch diameter of 4.812 inches. This arrangement permits testing up to 100 hp for shaft center distances from 10 inches up to 18 inches. Thus, with such a test apparatus, using just an ordinary 5 hp motor at the input end, each of the test belts 60 and 62 can be effectively subjected to a 100 hp load. A conventional prime mover-dynamometer certainly would require a 200 hp prime mover and a 200 hp dynamometer or brake, for example, since it would be undesirable to operate at maximum capacity.

A feature of the apparatus construction is that by using the hydraulic accummulator 122, it is possible to maintain a constant torque loading on each of the shaft portions 32 and 38 because it continuously compensates for any changes in the system which would result in perturbations in the hydraulic system. It is also very simple to run accelerated life testing of flexible transmission belts by increasing the magnitude of the torque loading beyond that encountered under actual service conditions.

Since the torque loading on the shafts 32 and 38 and shaft 16 is applied under control of the hydraulic rotary actuator 64, the apparatus of the invention is uniquely adaptable for applying varying and impulsive type loadings. This is accomplished by programming the hydraulic system of the hydraulic rotary actuator 64 to duplicate any repetitive rate of change of torque loading of any magnitude with respect to time. Thus, it is possible to test the belting under the most exacting conditions that are encountered in service.

The apparatus permits the performance of dynamic photoelastic studies. The apparatus is set-up for a life test except that the outer flange of one of the test pulleys 52 or 54 is removed when the belt teeth are to be observed as the belt trains around the pulley. A feature which is unique to the apparatus of the invention is the fact that static strain studies can be performed because the test belts can be made to carry not only the preload but also the tension load due to the torque while applied to the shafts motionless. These conditions cannot be arranged with a conventional prime mover-dynamometer assembly.

It should be appreciated that the test belts 60 and 62 together with their associated pulleys 52 and 56 and 54 and 58 may be replaced by interengaged gear sets arranged at the respective ends of drive shaft 16 and the associated driven shafts 32 and 38. The gears can be arranged in proper meshing engagement by adjusting the position of plate 12 on the frame 10. The gears then subjected to a torque loading by rotating on shafts 32 and 38 in respective opposite directions as before in the case of the belt testing.

As shown in hydraulic diagram FIG. 6, air pressure (about 50 pounds per square inch) is admitted to the hydraulic pressure unit 80 through a connecting line 120. An accumulator 122 is located in the connecting line 118 to the hydraulic pressure unit 80. A hydraulic pressure gauge 124 and associated pressure regulator 124' are located in the line 118 and also a hydraulic pressure gauge 126 and associated pressure regulator 126' are located in line 125 which branches off from the line 118. A four-way valve 128 is connected into the line 125 and into a branch return circuit 130 leading back to the reservoir 112. The hydraulic actuator 64 is connected to a four-way valve 128 by line 125. A four-way valve 116 is connected in line 118 to the hydraulic unit 18. The return flow from unit 18 is directed back through four-way valve 116 to line 114 and back to the reservoir 112. The preload is determined by adjusting pressure regulator 124'. The torque developed by the hydraulic actuator 64 is determined by the setting of the pressure regulator 126'.

Figure 8:
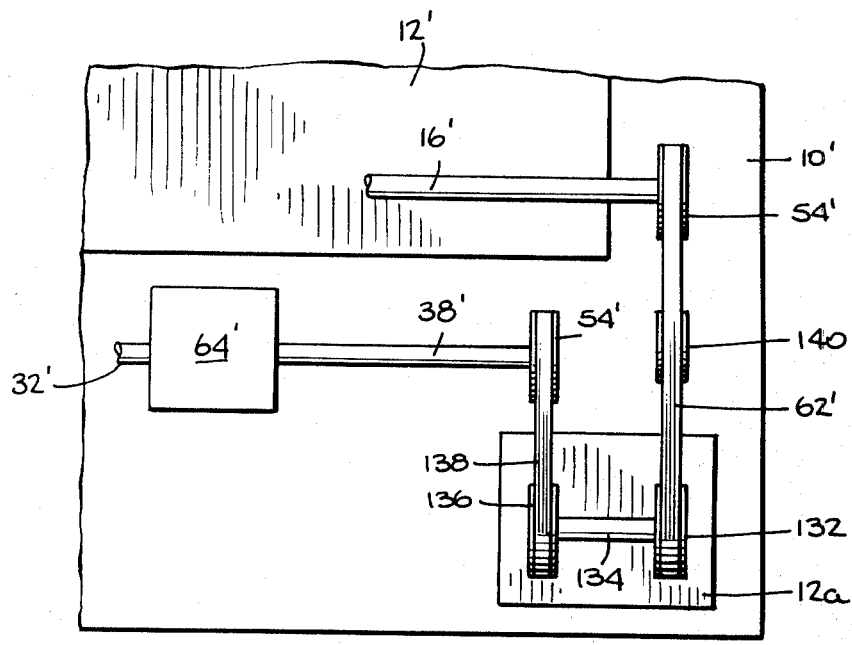
FIG. 8 is a schematic partial top plan view similar to FIG. 7 of another embodiment of the invention in which four belts can be tested simultaneously.

In the embodiment of the invention shown schematically in FIG. 8, a test belt 62' is located between a pulley 54' on the end of the drive shaft 16', and a pulley 132 on a shaft 134 which is mounted on a second sliding plate 12a which is slidable on the base frame 10'.

The shaft 134 also carries a pulley 136 carrying a test belt 138 which is trained at its opposite end around a pulley 54' of the shaft 38' connected to the rotary actuator 64'. With this arrangement, in addition to the belt 60, tested in the manner shown in respect to the previous embodiment, it is also possible to test a belt 62' and a third belt 138. In the arrangement shown in FIG. 8, an auxiliary pulley 140 is secured to the frame 10' and is adjustable in order to position the belt 62' to the desired preload. The pulley 140 can be either a backside idler or a toothed pulley operating as a three-point drive. This same modification can be made in respect to the shaft 32 on the opposite end of the accumulator 64' so that even a fourth test belt (not shown) can be tested at the same time.

Figure 9:
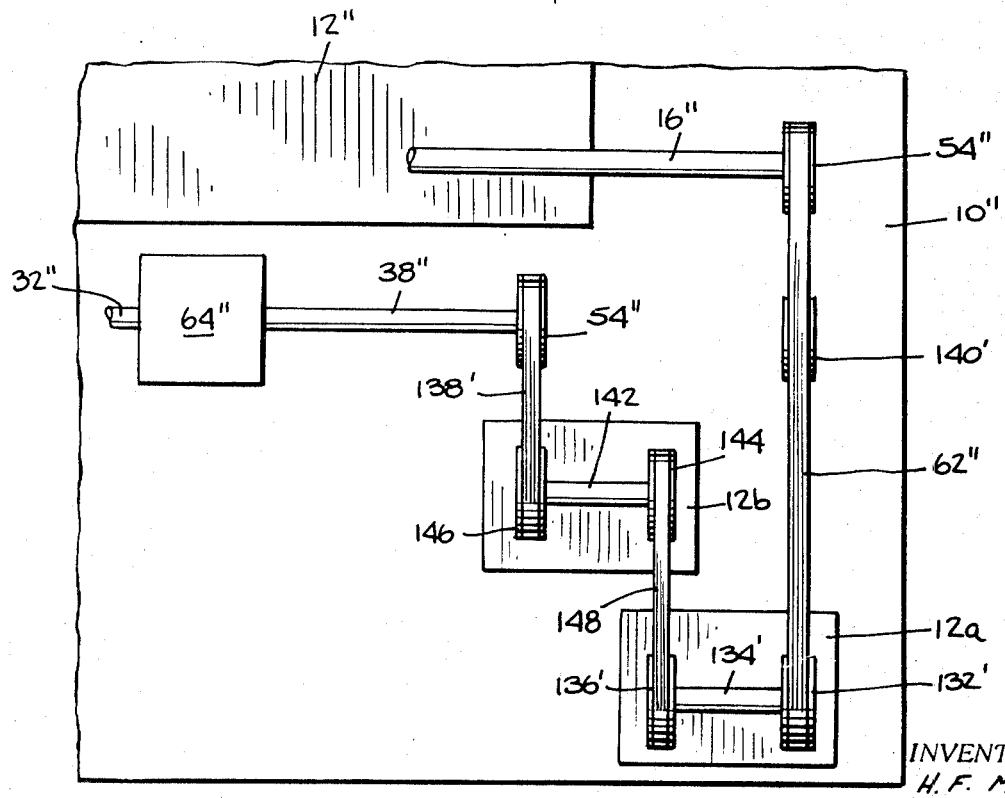
FIG. 9 is a view similar to FIG. 8 of still another embodiment of the invention in which six belts can be tested simultaneously .

FIG. 9 shows a further modification on a frame 10'' which includes a sliding baseplate 12b in addition to a sliding baseplate 12a' and the basic baseplate 12''. In this arrangement, the intermediate sliding baseplate 12b carries a shaft 142 having a pulley 144 at one end and a pulley 146 at the opposite end providing guides for a belt 148 and a belt 138' to be tested. In this arrangement, an additional belt 148 can be tested on each shaft 142 or 134'. The same modification can be made in respect to shaft 32'' on the opposite end of the accumulator 64'' so that six belts can be tested at the same time. It is obvious that this arrangement can be extended to cover a multiplicity of belts. As the number of test belts increases the capacity of drive motor 14 must be correspondingly increased to supply the power loss incurred with each additional belt.

The embodiment shown in FIG. 10 is a schematic indication of a modification for testing V-type transmission belts. The V-belt tester comprises substantially two transmission belt testers connected side-by-side on frames 10a and 10b. Each belt is associated with its own separate sliding baseplate 13a and 13b for accommodating belts 60a and 60b of different lengths and stretch characteristics and for imposing a predetermined preload. The drive shaft 17 is split into two shaft portions 17a and 17b and the inner ends are integrally connected together by a so-called "Schmidt" coupling 150 which is capable of permitting axial misalignment of shafts 17a and 17b while they are maintained parallel and while they are intergrally interconnected for rotation together. A rotating hydraulic actuator of the combined shaft positioning means is replaced by an internal gear pump 65 which is capable of applying and maintaining a constant torque loading to the two test V-belt drives through shafts 33 and 35. If desired, the hydraulic fluid cycle can be programmed to impose any desired varying torque loading on the V-belt test drives. The inner end of shaft 33 is fixably attached to the housing 69 of the pump 65 while the inner end of the shaft 35 is attached to the rotating internal gear 67 of the pump 65. When conducting a test run, the pump 65 and the two shafts 33 and 35 are integrally connected and rotated at the same speed as the shafts 17a and 17b. When the pump 65 is to apply a torque load to the V-belt test drives, hydraulic fluid is pumped from hydraulic pressure unit 80a through a rotating joint to an internal hole through shaft 35 to the pump. Return flow from pump 65 passes down a concentric hole in shaft 35 through the rotating joint back to reservoir 71 through conduit 73. When pressure is applied, the housing 69 is urged to rotate in one direction, and the gear 67 is urged to rotate in an opposite direction, whereupon the belts 60a and 60b are subjected to equal and opposite tensile loading. A strain gauge torsion bridge 110a is secured to the shaft 17d for measurement of the torque loading applied to shafts 17a, 17b, 33 and 35. The conduit 73 is connected to housing 69 through a rotary seal (not shown).

The apparatus of FIG. 10 thus makes it possible to test slipping-type drive components with belts that stretch during continued use such as V-belts with rayon fiber tension members. It is obvious that the apparatus can also be modified as indicated in FIGS. 8 and 9 to test multiple drives.

While specific embodiments of the invention has been shown and described in detail to illustrate the application of the principles of the invention, it will be understood that the invention may be embodied otherwise without departing from such principles.

What is claimed is:

1. A method for testing the performance of a plurality of power transmission components such as positive drive transmission belts and associated pulleys, interengaged gears, etc., under dynamic, static and slow rotational conditions using a drive shaft and two axially aligned driven shafts arranged substantially parallel to the drive shaft, comprising mounting the components to be tested on the respective opposite ends of the drive shaft and on the outer ends of the two axially aligned driven shafts for driving engagement between the respective ends of the drive shaft and the respective outer ends of the driven shafts, rotating the two axially aligned driven shafts in respective opposite rotative directions to apply a torque to the transmission components, and rotating the drive shaft.

2. A method for testing the performance of a plurality of power transmission components, according to claim 1, including applying a preload to the test components by moving the drive shaft in a direction away from the two driven shafts.

3. A method for testing the performance of a plurality of power transmission components, according to claim 1, including measuring the torque directly on the drive shaft.

4. A method of testing positive transmission belts and V-belts using a driving shaft with a belt drive pulley attached to each end and first and second driven shafts arranged parallel to the driving shaft and having outer ends with driven pulleys thereon aligned with the respective pulleys at the respective ends of the drive shaft, comprising arranging the belts to be tested over the corresponding drive pulleys and driven pulleys of the respective ends of the drive shaft and the respective driven shafts so that the drive shaft can drive the respective driven shafts at each end, rotating said first and second driven shafts relatively in respective opposite directions with respect to each other to apply a torque to the belts to be tested, and rotating the drive shaft.

5. A method of testing positive transmission belts and V-belts, according to claim 4, including applying a preload to the belts by moving said drive shaft and said driven shafts relatively in opposite separating directions.

6. A method of testing positive transmission belts and V-belts, according to claim 5, including locking the drive shaft and the driven shafts in the preloaded positions and rotating a drive shaft to drive said first and second driven shafts while said driven shafts are maintained in a predetermined spaced relative opposite rotative positions.

7. A method of testing positive transmission belts and V-belts, according to claim 4, using a rotary actuator positioned between said two driven shafts having a part affixed to one of said shafts which is rotatable in one direction and a part affixed to the other of said shafts which is rotatable in another direction in response to a fluid pressure applied thereto, comprising applying fluid pressure to the parts to provide a predetermined relative opposite directional rotational movement of said driven shafts relative to each other and maintaining the pressure to provide for a predetermined torque loading.

8. A method of testing positive transmission belts and V-belts, according to claim 7, including varying the pressure acting on the two parts in order to vary the torque loading.

9. An apparatus for testing transmission components such as belt drives and gear drives, comprising a rotatable drive shaft, means connected to said drive shaft for rotating said drive shaft, first and second driven shafts having inner ends arranged in spaced end-to-end relationship and outer ends, said drive shaft having respective outer ends aligned with respective outer ends of said first and second driven shafts with transmission component means extending between the respective outer ends of said drive shaft and the respective outer ends of said first and second driven shafts for rotating said driven shafts from said drive shaft, and rotation coupling means connected to the inner ends of said first and second driven shafts for rotating said first and second driven shafts together and in respective opposite directions of rotation by an amount to apply a predetermined torque to the transmission component means being tested.

10. An apparatus for testing transmission components such as belt drives and gear drives, according to claim 9, including means mounting said drive shaft in said first and second driven shafts so that said first and second driven shafts extend substantially parallel to said drive shaft and permitting relative movement of said drive shaft in respect to said first and second driven shafts in directions toward and away from each other, and means connected between said drive shaft and said first and second driven shafts for shifting said drive shaft relative said first and second driven shafts in order to preload the transmission component means being tested.

11. An apparatus for testing transmission components such as belt drives and gear drives, according to claim 9, wherein said drive shaft includes an intermediate coupling permitting parallel shifting movement of one end of said shaft relative to the other end whereby to accommodate transmission components of variable size such as V-belts.

12. An apparatus for testing transmission components such as belt drives and gear drives, according to claim 9, wherein said rotation means comprises first and second relatively rotatable parts affixed to said first and second driven shafts respectively, said first and second parts being rotatively displaceable relatively in response to fluid pressure, and means for applying fluid pressure between said parts.

13. An apparatus for testing transmission components such as belt drives and gear drives, according to claim 12, wherein one of said parts comprises a gear affixed to one of said shafts and the other of said parts comprises a housing surrounding said gear having a rack member which is displaceable to shift said housing with the associated shaft relative to said gear and which is in driving engagement with said gear.

14. An apparatus for testing transmission components such as belt drives and gear drives, according to claim 12, wherein one of said rotative parts comprises a pump housing and the other of said parts comprises a pump rotor.

15. An apparatus according to claim 9, wherein said rotation coupling means comprises a coupling for coupling said first and second driven shafts together for rotation together including a first part on said first driven shaft and a second part on said second driven shaft and means connected to at least one of said first and second coupling parts for shifting said coupling parts relatively for varying the rotative position of said first and second driven shafts and the torque applied to said transmission components.

16. An apparatus according to claim 15, wherein said means connected to at least one of said coupling parts is operatively connected to said parts for movement thereof during rotation of said first and second driven shafts.

17. An apparatus for testing drive belts, particularly positive drive transmission belts and V-belts, comprising a rotatable drive shaft having a belt drive pulley at each end, means connected to said drive shaft for rotating said drive shaft, first and second driven shafts having inner ends arranged in spaced end-to-end relationship and outer ends each with a driven pulley thereon, means mounting said drive shaft and said first and second driven shafts so that said first and second driven shafts extend substantially parallel to said drive shaft and permitting relative movement of said drive shaft in respect to said first and second driven shaft in directions toward and away from each other, said drive pulleys of said drive shaft and said driven pulleys of corresponding first and second drive shafts being located to accommodate a belt to be tested at the corresponding ends of said drive shaft and the first and second driven shafts, rotation coupling means connected to the inner ends of said first and second driven shafts for rotating said first and second driven shafts together and in respective opposite directions by an amount to apply a predetermined torque to the belts being tested, and means connected between said drive shaft and said first and second driven shafts for shifting said drive shaft relative to said first and second driven shafts to preload the belts being tested.

18. An apparatus for testing drive belts, according to claim 17, wherein said mounting means includes a support frame mounting said first and second driven shafts and a baseplate movable along said support frame carrying said drive shaft and said means for rotating said drive shaft.

19. An apparatus for testing drive belts, according to claim 18, including means for locking said baseplate in a fixed position on said support frame.

20. An apparatus for testing drive belts, according to claim 17, wherein said means for moving said drive shaft relative to said first and second driven shafts comprises a fluid pressure operated piston and cylinder combination connected between said frame and said baseplate.

21. An apparatus for testing drive belts, according to claim 20, including a load cell connected to said fluid piston and cylinder combination for indicating the preloading on the test belts when the baseplate is moved in a direction to move said drive shaft away from said first and second driven shafts.

22. An apparatus for testing drive belts, particularly positive drive transmission belts and V-belts, comprising a support frame, a baseplate mounted for movement on said support frame, a drive shaft mounted on said baseplate and having a belt drive pulley at each end of said drive shaft, first and second driven shafts on said frame having inner ends arranged in spaced end-to-end relationship to each other and having outer ends each with a driven pulley thereon located in alignment with the respective pulleys at the corresponding ends of the drive shaft for receiving a belt to be tested over each drive pulley at each end of said drive shaft, rotation drive means connected to the inner ends of said first and second driven shaft for rotating them in respective opposite directions, motor means connected to said drive shaft for rotating said drive shaft carried on said baseplate, and means connected between said frame and said baseplate for shifting said baseplate along said frame to move said drive shaft away from said first and second driven shafts in order to apply a preloading to the belts connected between said shafts.

23. An apparatus for testing drive belts, according to claim 22, including a threaded screw member carried by said baseplate, a stationary guide carried on said frame through which said screw member extends and a lock nut means rotatable on said screw member for locking said screw member in position in respect to said guide.

24. An apparatus for testing drive belts, according to claim 22, wherein said rotational drive means connected to the inner ends of said first and second driven shafts comprises a housing having a fluid pressure operated rack and being connected to one of said shafts, a gear connected to the other of said shafts and engaged by said rack, and fluid pressure means for actuating said rack for shifting said gear with its associated shaft in one direction and said rack with its associated shaft in an opposite direction relatively to each other to apply a torque to the belt being tested.

25. An apparatus for testing drive belts, according to claim 22, including a second baseplate movable on said frame, a third driven shaft rotatably supported on said second baseplate and having a third pulley at each end thereof one of which is arranged in a position to receive a belt trained around said third pulley at one end of said third driven shaft and around one end of said drive shaft, the other opposite end having a third pulley which is adapted to be aligned for engagement with a belt to be tested which is trained around said third pulley at said opposite end and said driven pulley at the end of one of said first and second driven shafts.

26. An apparatus for testing drive belts, according to claim 22, wherein said second driven shaft includes third and fourth driven shaft portions, and including second and third baseplates on said frame carrying said third and fourth driven shaft portions.

27. An apparatus for testing drive belts, according to claim 22, including an additional frame portion located alongside said support frame, a second baseplate slidable on said additional frame portion, said second baseplate and said baseplate supporting said drive shaft, said drive shaft having two separable portions interconnected by a drive coupling, the outer ends of said portions carrying a respective drive pulley, said coupling being such that said drive shafts may be oriented at spaced parallel positions in relation to each other when a belt engaged at the respective pulleys at the ends thereof comprises a V-belt having elastic characteristics.

28. An apparatus for testing drive belts, according to claim 22, wherein said rotational drive means connected to said first and second driven shafts comprises a pump having a rotor connected to one of said shafts and a housing connected to the other and means for applying fluid pressure to said pump to displace said shafts in opposite rotational directions for torque loading the belts to be tested.

29. A method for testing the performance of a plurality of power transmission components including positive drive transmission belts and associated pulleys, integrated gears, etc. and under dynamic, static and slow rotational conditions, and using a drive shaft and axially aligned, first and second driven shafts having inner ends rotatably coupled for rotation of said first and second driven shaft together and with the coupling parts connecting each of said first and second driven shafts being rotatable in respective opposite directions to vary the rotational positions of said first and second driven shafts and for positioning them in a relatively rotational position for rotation together and which first and second driven shafts are arranged substantially parallel to said drive shaft, comprising:

a. Mounting said components on the ends of said drive shaft and the outer ends of said first and second driven shafts for driving engagement of said ends of said drive shaft with the respective outer ends of said first and second driven shafts, b. Separating said drive shaft from said first and second driven shafts to apply a predetermined preload to each of said components, c. Rotating said first and second driven shafts in opposite directions with respect to each other to apply predetermined but counterbalancing torque-load simultaneously to said drive shaft, said first and second driven shafts and said components, and d. Rotating said drive shaft to rotate said driven shafts while maintaining said preload and said counterbalancing torque-load on said drive shaft, said first and second driven shafts and said components.

* * * * *